L. Z. PRESTON.
TILTING GATE.
APPLICATION FILED DEC. 14, 1911.
1,040,752.
Patented Oct. 8, 1912.
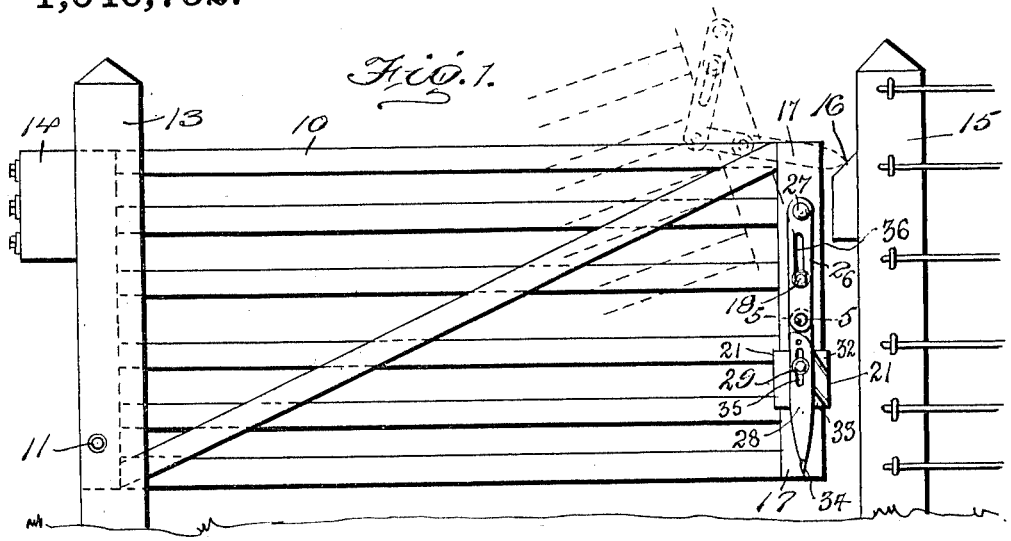
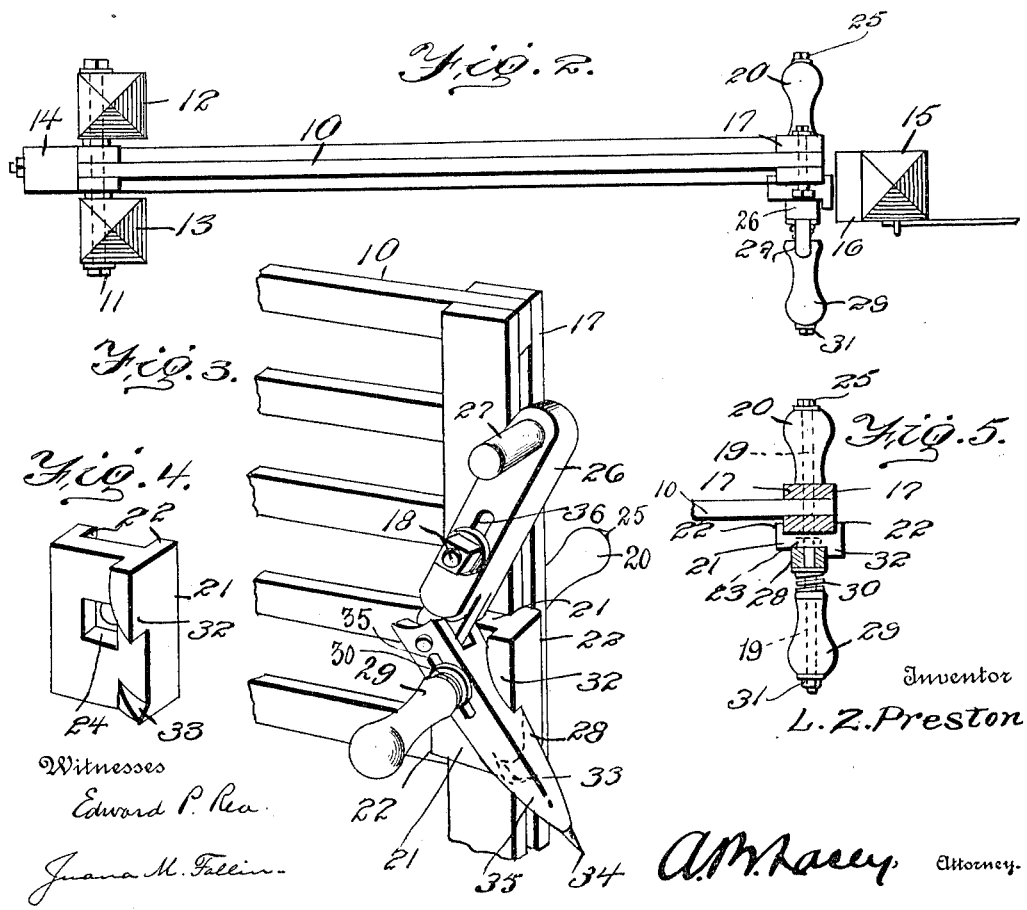
Witnesses
Edward P. Rea
Juana M. Fallin
Inventor
L. Z. Preston
A. W. Lacey, Attorney.

UNITED STATES PATENT OFFICE.

LEONARD Z. PRESTON, OF TOPEKA, KANSAS.

TILTING GATE.

1,040,752. Specification of Letters Patent. Patented Oct. 8, 1912.

Application filed December 14, 1911. Serial No. 665,701.

*To all whom it may concern:*

Be it known that I, LEONARD Z. PRESTON, citizen of the United States, residing at Topeka, in the county of Shawnee and State of Kansas, have invented certain new and useful Improvements in Tilting Gates, of which the following is a specification.

This invention relates to improvements in gates, more particularly to the class of tilting gates, and has for one of its objects to provide a simple attachment for the latch end of the gate to hold the gate in partially elevated position to permit small animals to pass beneath it, while preventing the larger animals from passing, and also to lock the gate in partly elevated position.

Another object of the invention is to provide a device of this character which may be applied without material structural change to tilting gates of various forms and arrangement of parts.

Another object of the invention is to provide a device of this character so located and arranged that it will not be liable to be released by any movement of animals passing beneath the partly elevated gate.

With these and other objects in view, the invention consists in certain novel features of construction as hereinafter shown and described, and then specifically pointed out in the claims, and in the drawings illustrative of the preferred embodiment of the invention: Figure 1 is a side elevation of a gate having the improvement applied; Fig. 2 is a plan view of the parts shown in Fig. 1; Fig. 3 is a perspective view of a portion of the gate with the improved attachment in position thereon; Fig. 4 is an enlarged perspective view of the locking block; Fig. 5 is a sectional detail on the line 5—5 of Fig. 1.

Corresponding and like parts are referred to in the following description and indicated in all the views of the accompanying drawing by the same reference characters.

The improved device may be applied without material structural change to gates of various forms and to gates constructed of different materials, but for the purpose of illustration is shown applied to a conventional farm gate represented as a whole at 10. The gate is pivotally connected at 11 at the "hinge" end between two posts 12—13, and is thus arranged to be tilted into vertical position when open. The gate is also provided with a counterweight 14 to assist in the operation. The gate is arranged to swing into relatively close relations to a post 15 at the "latch" end of the gate as shown. Connected to the inner face of the latch post is a stop block 16.

Projecting from the latch end member 17 of the gate is a stop pin 18, and extending through the same member and spaced below the stop pin is a rod 19, the rod extending for some distance beyond the opposite faces of the gate, as shown. Mounted upon the rod 19 at one side of the gate is a lifting handle 20. Bearing against the member 17 at the side opposite to the handle 20 is a block 21 having ribs 22 to retain it in position upon the member 17. The rod 19 passes through the block 21 and is provided with a stop collar or enlargement indicated at 23, the enlargement being embedded in a cavity 24 in the face of the block. The rod 19 is threaded at its ends, one threaded end supporting a clamp nut 25 whereby the lifting handle 20 is retained in position, the strain being applied between the enlargement 23 and the nut as shown in Fig. 5. Mounted to swing upon the pin 18 is an operating bar 26 having an operating handle 27, while a stop bar 28 is mounted to swing upon the rod 19 and bearing against the block 21. The rod 19 is provided with a lifting handle 29, and surrounding the rod 19 between the handle 29 and the member 28, is a spring 30.

As before stated, the rod 19 is threaded at both ends, and engaging the rod in advance of the handle 29, is a clamp nut 31. By this means the member 28 is maintained in position yieldably against the outer face of the block 21. The block 21 is provided with an upper stop lug 32, and a lower stop lug 33, the lug 33 having inclined faces as shown in Fig. 4. The member 28 is reduced at one end and rounded and is provided with a terminal spur 34 as shown. The members 26—28 are pivotally united at their adjacent ends as shown, the joint between the members being so formed that the members will not move beyond a vertical line in one direction as represented in Fig. 1, but are free to move in the opposite direction upon the pin 18 and the rod 19, as represented in Fig. 3. When the members 26—28 are arranged in vertical alinement as shown in Fig. 1, the stop lugs 32—33 will be located at one side of the vertically alined members, but when the members 26—28 are arranged as shown in Fig. 3, the rounded reduced portion of the member 28 will pass over the inclined lug 33 and be disposed with its upper side against the lower end of the lug 32, the spring 30 permitting the member 28 to move outwardly and against the resistance of the spring and passing over the inclined lug 33, and the reaction of the spring will retain the member 28 yieldably in its oblique position. The members 26 and 28 are slotted as shown at 35—36 where the pin 18 and the rod 19 pass through them, so that the requisite longitudinal play or movement is permitted to the members when moved from a vertically alined position as shown in Fig. 1 into the reversely oblique position as shown in Fig. 3. By this arrangement it will be obvious that the member 28 will be yieldably maintained in its oblique position.

By employing the handles 20—29 upon opposite sides of the gate, the gate may be readily elevated from either side. By this arrangement it will be obvious that when the member 26 is swung upon its pivot pin 18, the member 28 will be correspondingly moved and in the opposite direction. The block 16 is so located that when the gate 10 is moved upwardly upon its pivot 11 with the members 26—28 in vertical alinement, the hinged members will pass the block, but when the gate has been elevated to a sufficient extent, the arm or bar 26 is actuated by moving its upper end outwardly with the result of moving the free end of the bar 28 also outwardly and above the stop 16 with which the spur 34 engages and thus supports the gate in its partly elevated position.

When the gate is to be elevated the operator grasps the handle 20 or 29 as the case may be and swings the gate upon the pivot pin 11, and when the gate reaches the desired height the operator forces the handle 27 outwardly and thus swings the free end of the lock bar 28 likewise outwardly to a point above the stop 16 with which it engages by its spur 34, and locks the gate in its partly elevated position. When the member 26 is thus actuated to throw the member 28 into operative position, the latter passes over the inclined stop lug 33 and against the stop 32, as before described, thus locking the member 28 yieldably in position and preventing its accidental displacement.

As disclosed in the drawing the upper edge of the block 16 is preferably beveled or inclined so as to receive the pointed terminal of the member 28 at various angles.

When it is desired to release the gate and close the same, the operator simply manipulates the handle 27 in the opposite direction and swings the member 26 inwardly into parallel relations to the member 17, this movement likewise releasing the member 28 from engagement with the stop lugs 32—33 and disposing it in parallel relations to the members 17 and 26. The gate is then free to be returned to its horizontal or closed position, the counterweight 14 preventing undue rapid downward movement of the gate.

The improved device is simple in construction, can be inexpensively manufactured of wood or metal as may be preferred, and applied, as before stated, without material structural change to tilting gates of various forms and constructions.

Having thus described the invention, what is claimed as new is:

1. The combination with a tilting gate and gate post, of a locking bar mounted to swing intermediate the ends upon the gate and adapted to engage at one end with said post, and an operating bar mounted to swing intermediate the ends upon the gate and hingedly connected at one end to the other end of the locking bar.

2. The combination with a tilting gate and gate post, of a rod extending through the gate, handles upon said rod at opposite sides of the gate, a locking bar swinging upon the rod and adapted to engage with said post, and an operating bar swinging upon the gate and hingedly connected to the locking bar.

3. The combination with a tilting gate and gate post, of a rod extending through the gate, handles upon said rod at opposite sides of the gate, a block upon the gate and through which said rod passes, said block having stop lugs, a locking bar swinging upon said rod and bearing against said block, a spring between said locking bar and the adjacent handle, and an operating bar swinging upon the gate and hingedly connected to the locking bar, said locking bar being yieldably held between said stop lugs when moved into operative position.

4. The combination with a tilting gate and gate post, of a stop block upon the gate post and having an inclined upper face, a locking bar swinging upon the gate and adapted to engage with said stop block, and an operating bar swinging upon the gate and hingedly connected to the locking bar.

5. The combination with a tilting gate and gate post, of a stop block upon the gate post and having an inclined upper face, a locking bar swinging upon the gate and having a terminal spur and adapted to engage with said stop block, and an operating bar swinging upon the gate and hingedly connected to the locking bar.

6. The combination with a tilting gate and a post, of a locking bar mounted to swing intermediate the ends upon the gate, an operating bar mounted to swing intermediate the ends upon the gate and hingedly connected at one end to the adjacent end of the locking bar, and a handle upon the operating bar to move the same, whereby the free end of the locking bar is projected into the path of the post.

7. The combination with a tilting gate and a post, of a locking bar swinging upon the gate for engagement with the post, an operating bar having a longitudinal slot and hingedly connected to the locking bar, a pin carried by the gate and engaging through the slot, and a handle carried by the operating bar.

8. A tilting gate, a locking bar swinging upon the gate, an operating bar mounted for pivotal and longitudinal movement upon the gate above the locking bar and having hinged connection therewith, and a handle carried by the operating bar for moving the same to project and retract the free end of the locking bar.

In testimony whereof I affix my signature in presence of two witnesses.

LEONARD Z. PRESTON. [L. S.]

Witnesses:
W. A. PRESTON,
U. G. SUTTON.

Copies of this patent may be obtained for five cents each, by addressing the "Commissioner of Patents, Washington, D. C."